(12) United States Patent
Fernandez et al.

(10) Patent No.: US 11,092,315 B2
(45) Date of Patent: Aug. 17, 2021

(54) DEVICE FOR CLOSING A VEHICLE OPTICAL HOUSING OPENING, OPTICAL HOUSING EQUIPPED WITH SUCH A DEVICE AND CORD FOR THE DEVICE

(71) Applicant: Valeo Iluminacion, Martos (ES)

(72) Inventors: Ricardo Fernandez, Martos (ES); Juan-Francisco Moreno, Torremolinos (ES); Juan Antonio Rubia Mena, Martos (ES); Damien Cabanne, Martos (ES); Ramon Pastor, Martos (ES); Francisco Ruiz, Martos (ES); Gonzalo Madorran Til, Martos (ES)

(73) Assignee: Valeo Iluminacion, Martos (ES)

( * ) Notice: Subject to any disclaimer, the term of this patent is extended or adjusted under 35 U.S.C. 154(b) by 454 days.

(21) Appl. No.: 15/223,516

(22) Filed: Jul. 29, 2016

(65) Prior Publication Data
US 2017/0051891 A1 Feb. 23, 2017

(30) Foreign Application Priority Data
Jul. 31, 2015 (FR) .................................. 1557429

(51) Int. Cl.
*B60Q 1/00* (2006.01)
*F21V 15/01* (2006.01)
*F21S 45/00* (2018.01)
*B65D 55/16* (2006.01)

(52) U.S. Cl.
CPC .............. *F21V 15/01* (2013.01); *B60Q 1/007* (2013.01); *B65D 55/16* (2013.01); *F21S 45/00* (2018.01)

(58) Field of Classification Search
CPC ........... F21S 48/30; F21S 45/00; F21V 15/01; B65D 55/16; B60Q 1/007
See application file for complete search history.

(56) References Cited

U.S. PATENT DOCUMENTS

| 1,391,361 | A | * | 9/1921 | Beach | B60Q 1/34 |
| | | | | | 116/43 |
| 3,981,053 | A | * | 9/1976 | Kreuzer | F16L 33/08 |
| | | | | | 24/20 EE |
| 6,322,239 | B1 | * | 11/2001 | Nitta | B60Q 1/007 |
| | | | | | 362/543 |
| 6,540,385 | B2 | | 4/2003 | Ikeda et al. | |

(Continued)

FOREIGN PATENT DOCUMENTS

| CN | 2315068 Y | | 4/1999 | |
| CN | 202838382 U | * | 3/2013 | ........... G06K 19/067 |

(Continued)

OTHER PUBLICATIONS

Chinese Office Action dated Apr. 1, 2021, issued in Chinese Patent Application No. 201610620265.0 (with English translation).

*Primary Examiner* — Evan P Dzierzynski
(74) *Attorney, Agent, or Firm* — Oblon, McClelland, Maier & Neustadt, L.L.P.

(57) ABSTRACT

A device for closing a vehicle optical housing opening, the device including a cap, the cap being configured to close the opening in response to a reversible movement. The device further includes flexible or articulated connecting means fixed to the cap and designed to be fixed to the housing so that, after opening, the cap remains attached to the housing by the connecting means.

28 Claims, 4 Drawing Sheets

(56) References Cited

U.S. PATENT DOCUMENTS

| | | | |
|---|---|---|---|
| 2002/0067619 A1 | 6/2002 | Ikeda et al. | |
| 2005/0230991 A1* | 10/2005 | Ichioka | B60R 7/04 296/37.1 |
| 2010/0214800 A1* | 8/2010 | Yashiki | F21S 45/48 362/546 |
| 2015/0197179 A1* | 7/2015 | King | B60Q 1/0683 362/460 |
| 2016/0288968 A1* | 10/2016 | Wang | C09J 7/29 |
| 2016/0372233 A1* | 12/2016 | Faoucher | B60Q 1/0088 |

FOREIGN PATENT DOCUMENTS

| | | | | |
|---|---|---|---|---|
| DE | 102008032278 A1 | 2/2009 | | |
| FR | 2611252 A1 | 8/1988 | | |
| FR | 2711213 A1 | 4/1995 | | |
| FR | 2817517 A1 | 6/2002 | | |
| FR | 2916173 A1 | 11/2008 | | |
| JP | H09298001 A | 11/1997 | | |
| JP | 2001236805 A | 8/2001 | | |
| KR | 2010058095 A | * | 11/2008 | B60Q 1/076 |
| KR | 10-2010005809 | 6/2010 | | |

\* cited by examiner

DEVICE FOR CLOSING A VEHICLE OPTICAL HOUSING OPENING, OPTICAL HOUSING EQUIPPED WITH SUCH A DEVICE AND CORD FOR THE DEVICE

CROSS-REFERENCE TO RELATED APPLICATIONS

This application claims priority to the French application 1557429, filed Jul. 31, 2015, which application is incorporated herein by reference and made a part hereof.

BACKGROUND OF THE INVENTION

1. Field of the Invention

The invention lies in the field of automotive equipment, to be more precise in the field of lighting devices.

Housings for vehicle optical, in other words for lighting and/or signalling device for vehicle, include in known manner a light source and various elements for projecting the light out of the housing. These housings frequently further include an opening, for example to access the interior of the housing, and a cap designed to be fixed over that opening. A first problem caused by these caps is that once separated from the housing it is easy to mislay them or to lose them, causing a loss of time for the operator.

Another problem stems from the fact that in some circumstances it is important that the cap be manipulated by a competent person so that it is replaced perfectly after it has been removed, for example to prevent ingress of water into the housing. It is therefore necessary to prevent the cap from being removed by the user of the vehicle, for example, or at least to be able to verify that this was the case in the event of a problem.

2. Description of the Related Art

From the document DE 10 2008 032278 there is known a cap for closing a vehicle optical housing opening, the cap closing the opening thanks to a rotation movement and freeing the opening thanks to a rotation movement in the other direction. The edge of the cap includes flaps that inter-engage with teeth on the housing during the movement of closing the cap but are broken or deformed irreversibly on movement in the opposite direction.

The above document does not describe any means to prevent mislaying or losing such a cap.

SUMMARY OF THE INVENTION

The invention proposes a device for closing a vehicle optical housing opening, the device including a cap, the cap being configured to close the opening thanks to a reversible movement, characterized in that it further includes flexible or articulated connecting means fixed to the cap and designed to be fixed to the housing so that, after opening, the cap remains attached to the housing by the connecting means.

When fixed to the cap and to the housing, the flexible or articulated connecting means fasten these two elements together in a flexible manner. The cap therefore remains connected to the optical housing at all times and can no longer be lost. The optic may be a headlight at the front of the vehicle or a rear optic.

The reversible opening movement may be any movement making it possible to attach the cap to the housing and/or to release it, for example a rotation movement, for example of the quarter-turn type.

The connecting means may consist of a small cord, a small chain, etc. but the connecting means may advantageously consist of a first flexible cord.

The cord may have two ends, a first end including means for fixing it to the cap and a second end including means for fixing it to the housing.

The first cord is for example made from a plastic material designed to resist a hostile environment. It may be solid or hollow, in which case it consists of a tube, of circular or flat section. It may optionally be made of a material that is elastic.

The invention covers any fixing means such as screwing, riveting, gluing, clipping, etc. The fixing means at the ends of the first cord may consist in a through-opening, for example for screw-fixing, or a flattened part, for example for gluing, etc.

The connecting means may advantageously further include means for detecting the first opening of the cap.

As indicated above, it can be useful, in the event of a problem with an optic, to detect that the housing has been opened by an unauthorized person. The invention then proposes to associate means for detecting the first opening of the cap by means of a flexible or articulated connection.

In accordance with the embodiments of this aspect of the invention that will be described in detail hereinafter, the first end of the first cord is preferably designed to be fixed to the cap and the second end is preferably designed to be fixed to the housing.

The first opening detection means may advantageously include a second flexible cord having two ends, a first end including means for fixing it either to the cap or to the housing and a second end connected to the first cord.

The second cord may include a portion that changes appearance irreversibly in response to traction, so that movement of the cap with a view to freeing the opening causes traction on the second cord and therefore its change of appearance.

In accordance with this aspect of the invention, the first opening detection means include a second cord associated with the first cord. By "associated with the first cord" is meant that this second cord is connected to the first cord by its second end. The first and second cords then form a single assembly, taking the form (see below) of either a Y or of a linear cord, preferably consisting of the same material. The first end of the second cord includes, like the first cord, means for fixing it either to the housing or to the cap.

The second cord differs from the first in that it includes a portion that changes appearance if this second cord is subjected to traction. This traction may be caused by opening the cap. In fact, vehicle optical housing caps are generally opened and closed by a rotation movement, in particular a so-called "quarter-turn" movement, which causes displacement of at least the border of the cap.

The second cord is preferably connected by its first end to the housing (respectively to the cap) and fixed by its second end, directly or via the first cord, to the cap (respectively to the housing). The opening, for example quarter-turn, movement creates tension at least in the second cord.

Hereinafter the assembly formed by the first and second cords will be referred to as the "opening aid".

In a first embodiment, the first end of the second cord may include means for fixing it to the housing and the second end of the second cord may be connected to a point of the first cord between its first and second ends.

In this embodiment, the second end of the second cord is connected to the first cord and, in use, the first end is fixed to the housing. The opening aid then assumes a Y shape.

If the cap is subjected to a quarter turn to open it, the rotation movement creates tension in the first cord, which is transmitted to the second cord, which causes its change of appearance.

In a variant of this first embodiment, the first end of the second cord may include means for fixing it to the cap and the second end of the second cord may be connected to a point of the first cord between its first and second ends.

The opening aid then assumes the shape of a Y, but the first end of the second cord is, in use, fixed to the cap. It functions in the same way as before.

In a second embodiment, the first end of the second cord may include means for fixing it to the cap and the second end of the second cord may be connected to the first end of the first cord.

In this embodiment, in use, the first end of the second cord is connected to the cap and the second end is connected to the first end of the first cord, both of which are fixed to the housing. The opening aid then assumes a linear shape, the first and second cords being in line with each other.

The rotation movement of the cap to open it creates tension in at least the second cord.

In a variant of the second embodiment, the first end of the second cord may include means for fixing it to the housing and the second end of the second cord may be connected to the second end of the first cord.

The opening aid then assumes a linear shape, but this time, in use, the second end of the first cord and the second end of the second cord are fixed together to the cap and the first end of the second cord is fixed to the module. The rotation movement of the cap to open it creates tension in at least the second cord.

The portion that changes appearance irreversibly may advantageously be a weak portion of the second cord or a portion adapted to change color.

For example, the portion that changes appearance may be an optionally elastic portion of the second cord that has been weakened, for example by a reduction of diameter, removal of material, etc. The second cord may also include a loop closed by a weak link that breaks under tension, freeing the loop.

In another variant, the cord does not break under tension but changes color locally.

The portion of the second cord that changes appearance irreversibly may advantageously be one of the following portions: the first end portion, the second end portion, a portion between the first end portion and the second end portion.

The portion that changes appearance may be situated anywhere on the second cord, notably at one of its ends. In the case of an opening aid (whether of Y-shape or linear shape), the first end of the second cord of which is fragile, for example, this aid is then separated into two distinct cords by the tension.

Alternatively, the detection means may be situated on the first cord. The first opening detection means may then include means that change appearance irreversibly in response to traction but without breaking, e.g. a change of color. This single cord then fulfils both functions: captive cap and indication of opening.

In accordance with another variant of the invention, the two cords may be separate.

The cap may advantageously include fixing means adapted to cooperate with the fixing means of the first and/or the second cord to achieve a simple press-on fixing of an end of the cord or cords to the cap.

It is advantageous for the opening aid to be fixed rapidly by authorized personnel, either when mounted for the first time or because it must be replaced after unauthorized opening of the cap. The cap and the opening aid may for example comprise male and female parts that make it possible to obtain this simple press-on fixing rapidly. These male and female parts may advantageously include detents that cooperate to make pulling off this opening aid difficult, notably by an unauthorized person.

The fixing means of the cap adapted to cooperate with the fixing means of the first or second cord may advantageously be situated in the vicinity of the periphery of the cap.

Disposing these means in the vicinity of the periphery of the cap means that the opening movement, for example rotation, of the cap causes a greater displacement of these fixing means relative to the housing and therefore a greater tension in the cord or cords, which is favorable to its change of appearance.

The invention also relates to a vehicle optical housing including an opening and a device in accordance with the invention.

The housing may advantageously include means adapted to cooperate with an end of the first and/or the second cord to achieve a simple press-on fixing of one end of the cord or cords to the housing.

Like the cap, the housing may include male parts (respectively female parts) that cooperate with the female parts (respectively male parts) of the opening aid, which are advantageously notched.

The invention also relates to a Y-shaped flexible cord including fixing means at the end of each of its branches, one of the branches of the Y including a portion adapted to change appearance irreversibly in response to traction.

The opening aid is then a product in its own right, designed to cooperate with the housing and its cover. In fact, it is useful to have this product available for a first fit and in case of replacement after opening. In the present instance, the opening aid is Y-shaped.

The invention also relates to a linear flexible cord including first fixing means at its first end, second fixing means at its second end and third fixing means at an intermediate point between its first and second ends, the cord including a portion adapted to change appearance irreversibly in response to traction.

In this case, the opening aid has a linear shape.

These and other objects and advantages of the invention will be apparent from the following description, the accompanying drawings and the appended claims.

BRIEF DESCRIPTION OF THE ACCOMPANYING DRAWINGS

Embodiments and variants will be described hereinafter by way of nonlimiting example and with reference to the appended drawings, in which.

DETAILED DESCRIPTION OF THE PREFERRED EMBODIMENTS

Figure 1A:
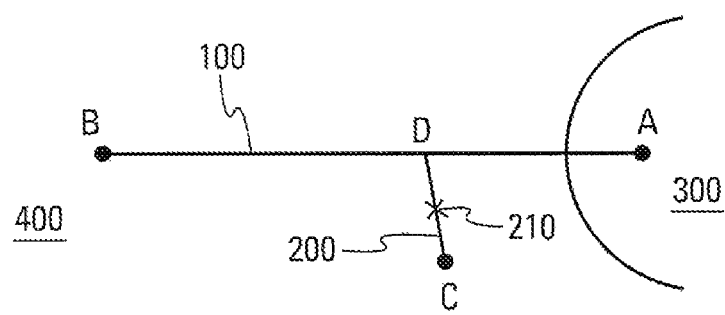
FIGS. 1A to 1D show diagrammatically four embodiments of the invention.

The invention aims to provide a device for closing an opening in an optical housing 400 of a vehicle, in particular a motor vehicle. The device comprises a cap 300 and means for attaching the cap 300 to the housing 400 so that it cannot be lost. In accordance with one advantageous variant, the invention also makes it possible to detect the first opening of the cap 300. To this end, it proposes connecting means between the cap 300 and the housing 400 taking the form of a flexible or articulated element referred to hereinafter as an opening aid.

In accordance with preferred embodiments, the opening aid includes a first cord 100 and a second cord 200 connected to each other. The first cord 100 has a first end A and a second end B. The second cord 200 has a first end C and a second end D. The function of the first cord 100 is to attach the cap 300 to the housing 400. By convention, in use, the first cord 100 will be considered to be fixed to the cap 300 by its first end A and to the housing 400 by its second end B.

The second cord 200 is connected to the first cord 100. By convention, it will be considered that it is connected to it by its second end D. There are three ways to connect the second cord 200 to the first cord 100:

The second end D is connected to the first cord 100 at a point between its two ends A, B, The second end D is connected to the first cord 100 by its first end A, The second end D is connected to the first cord 100 by its second end B.

The function of the second cord 200 is to indicate the first opening of the cap 300. In the embodiments shown, this first opening is indicated by the breaking of the second cord 200. To this end it includes a weak point or portion 210 that may be situated at one of its ends C, D or at a point between its ends.

In the first embodiment shown diagrammatically in FIG. 1A, the second cord 200 is connected by its second end D to a point between the first end A and the second end B of the first cord 100 and its first end C is fixed to the housing 400. When the cap 300 is rotated to remove it, this movement causes a displacement of the first end A of the first cord 100, in the clockwise or anticlockwise direction, and traction on the first cord 100; that traction is transmitted to the second cord 200 and causes it to break at the weak point or portion 210. The movement of the first end A of the first cord 100 and the traction exerted on the first cord 100 (and therefore indirectly on the second cord 200) are all the greater in that this first end A is fixed to the cap 300 at its periphery.

Figure 1B:
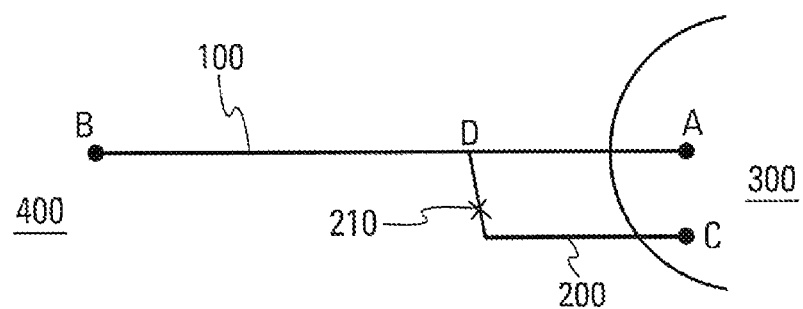

The second embodiment shown diagrammatically in FIG. 1B is similar to the first embodiment but in this case the first end C of the second cord 200 is fixed to the cap 300. Traction on opening the cap 300 is therefore exerted directly on both the first cord 100 and the second cord 200. In this embodiment, it is advantageous for the first end A of the first cord 100 to be fixed near the center of the cap 300 and for the first end C of the second cord 200 to be fixed to the periphery of the cap 300 to obtain a greater traction on the second cord 200 than on the first cord 100.

Figure 1C:
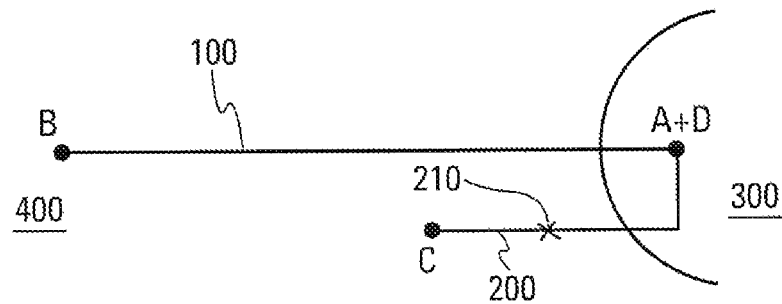

In the diagrammatic third embodiment shown in FIG. 1C, the second cord 200 is connected by its second end D to the first end A of the first cord 100, and therefore also to the cap 300, and its first end C is fixed to the housing 400. As in the second embodiment, it is advantageous for the second end D of the second cord 200 to be fixed to the cap 300 at its periphery to obtain a large displacement and therefore a high traction on the second cord 200.

Figure 1D:
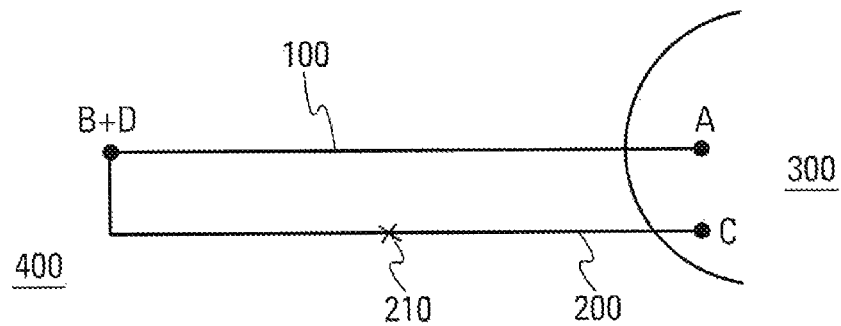

In the diagrammatic fourth embodiment shown in FIG. 1D, the second cord 200 is connected by its second end D to the second end B of the first cord 100, and therefore also to the housing 400, and its first end C is fixed to the cap 300. As in the second embodiment, it is advantageous for the first end C of the second cord 200 to be fixed to the cap 300 at its periphery to obtain a greater displacement and therefore a higher traction on the second cord 200.

Figure 2:
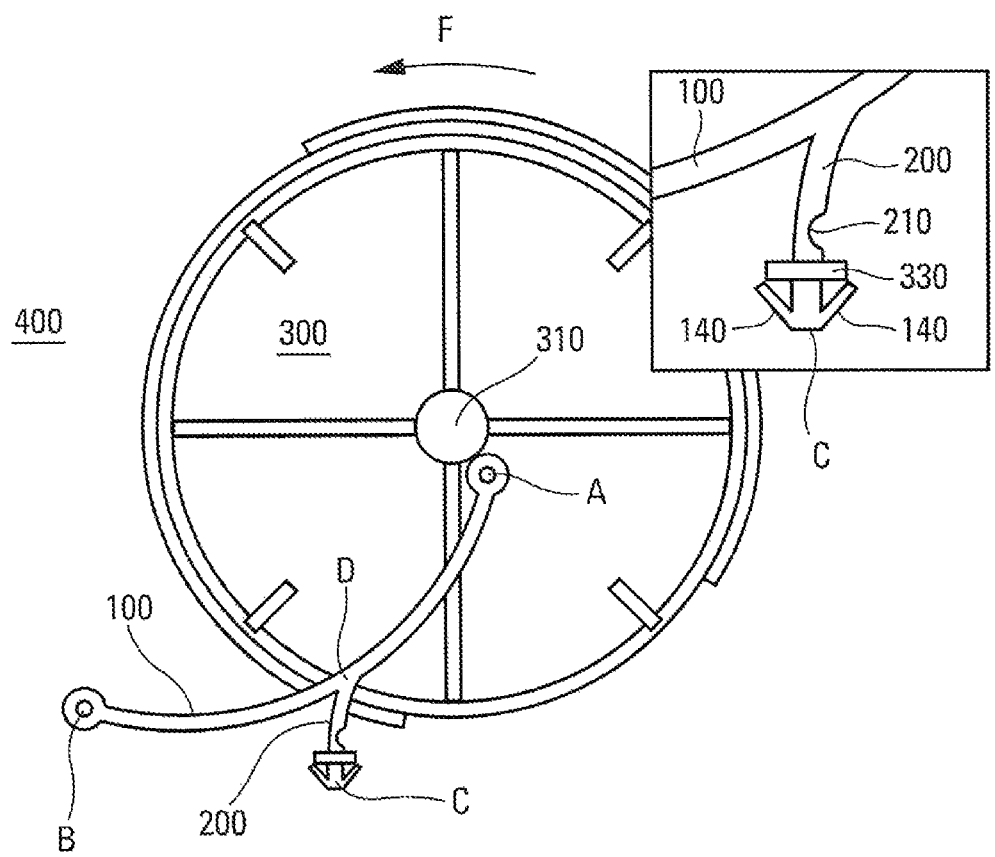
FIG. 2 shows in detail the embodiment from FIG. 1A and includes an enlarged view of a portion of the device.

FIG. 2 shows an embodiment of the FIG. 1A diagram. The cap 300 is of circular shape including a central portion 310 and is fixed to the housing 400 by rotation. The opening aid is of the Y-shaped type and is formed of:

a first cord 100 the first end A of which is fixed to the cap 300 and the second end B of which is fixed to the housing 400; as shown in FIG. 2, the first end A is fixed near the central portion 310 of the cap 300, but it could be fixed to the periphery of the cap 300, a second cord 200 having a first end C fixed to the housing 400 and a second end D connected to the first cord 100, between its first end A and its second end B, approximately halfway between the first and second ends A, B of the first cord 100.

The means for fixing the first and second cords 100, 200 to the housing 400 or the cap 300 will be described later.

The second cord 200 is shorter than the first cord 100, approximately five times shorter as shown in FIG. 2.

As can be seen in the enlarged view, the second cord 200 includes a weak point or portion 210 consisting in a large reduction of the diameter of this second cord 200, between its first and second ends C, D. Alternatively (not shown), this weak point or portion 210 could be situated at the level of its first end C or its second end D.

The opening movement of the cap 300 in the direction of the arrow F causes a displacement of the first end A of the first cord 100 and tensions it; consequently, the second cord 200 is also tensioned and this opening movement of the cap 300 ultimately causes the second cord 200 to break at its weak point or portion 210. This tensioning of the first cord 100 and the second cord 200 will be all the greater if the first end A of the first cord 100 is fixed close to the periphery of the cap 300.

The opening aid is made of plastic material, for example, the material having some elasticity imparting to the first and second cords 100, 200 the flexibility necessary for manipulating the cap 300 whilst allowing the weak point or portion 210 to break under tension.

After opening it, the cap 300 remains attached to the housing 400 by the first cord 100 and the second cord 200 is broken, indicating the first opening.

Figure 3:
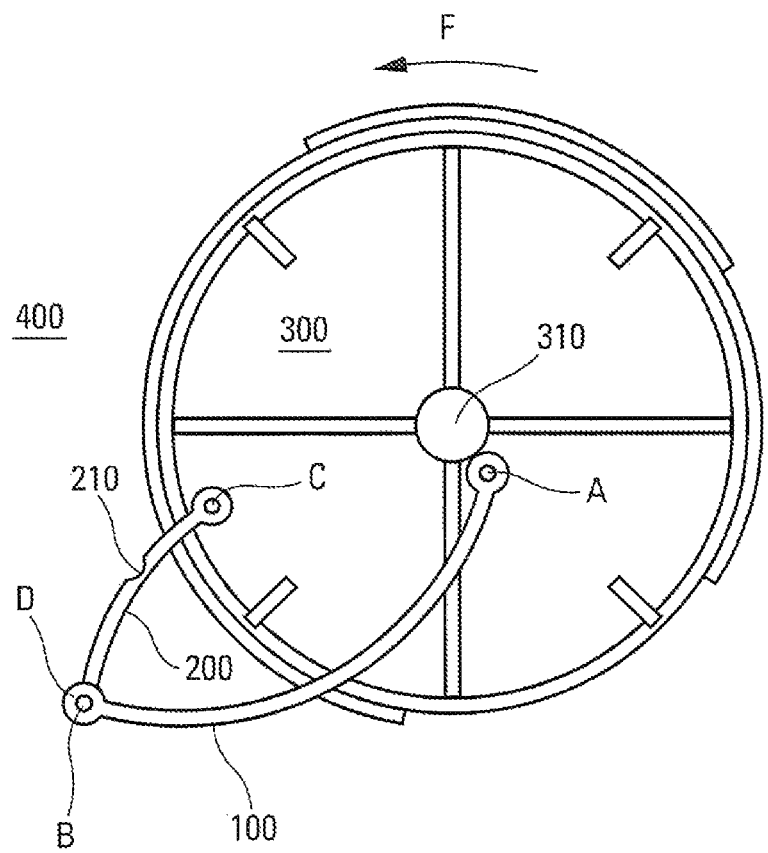
FIG. 3 shows in detail the embodiment from FIG. 1D.

FIG. 3 shows another embodiment of the invention corresponding to the FIG. 1D diagram.

The first cord 100 is identical to that from FIG. 2. The second cord 200 on the other hand has a first end C fixed to the border of the cap 300 and a second end D that is common to the second end B of the first cord 100, both being fixed to the housing 400. As before, the second cord 200 includes a weak point or portion 210 between its first end C and its second end D.

The opening movement of the cap 300 in the direction of the arrow F causes a displacement of the first end C of the second cord 200 and tensions it; this opening movement of the cap 300 ultimately causes the second cord 200 to break at its weak point or portion 210. This tensioning of the second cord 200 will be all the greater if the first end C of the second cord 200 is fixed close to the periphery of the cap 300.

Figure 4:
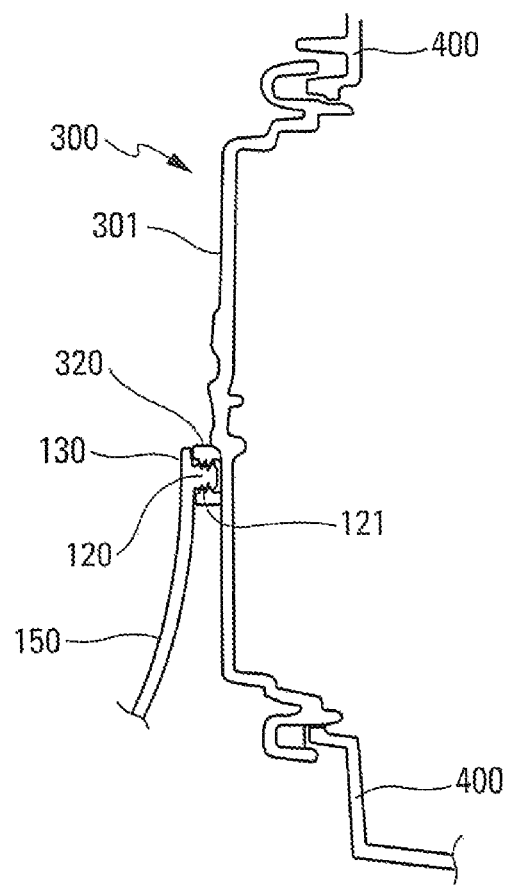
FIG. 4 shows in cross section one way of fixing a cord to a cap.

As shown in FIG. 4, the cap 300 is advantageously fixed in a fluid-tight manner to the housing 400. The latter accommodates internally various optical elements, not shown, such as one or more light sources, reflectors and/or light guides, etc.

FIG. 4 also shows means for fixing a cord 150, which may be the first cord 100 or the second cord 200, to the cap 300. These fixing means include on the one hand a cavity 320 on the external face 301 of the cap 300 and on the other hand a protrusion 120 at the end of the cord 150, which protrusion 120 preferably extends orthogonally to a longitudinal axis of the cord 150, as shown in FIG. 4. Opposite the protrusion 120 relative to this longitudinal axis lies a flattening 130 of the cord 150. Alternatively, the cavity 320 could be at the end of the cord 150 and the protrusion 120 on the cap 300.

The shapes of the protrusion 120 and of the cavity 320 are designed to cooperate with a view to a simple press-on fixing of the cord 150 to the cap 300 via the flattening 130, the protrusion 120 entering the cavity 320 with friction. To favor the correct assembly of the protrusion 120 in the cavity 320, the protrusion 120 may have on its surface a series of annular detents 121, for example, that are able to cooperate with homologous detents (not shown) on the internal surface of the cavity 320.

Of course, the same fixing means may be used for fixing the cord 150 to the housing 400.

The enlarged view in FIG. 2 shows other means for fixing the second cord 200. In this embodiment, the end C of the second cord 200 includes two barbs 140 forming a harpoon-like shape and a hoop 330 extends from the surface of the housing 400. Fixing is simply achieved by inserting the harpoon-shaped end of the second cord 200 into the hoop 330. The barbs 140 spread apart and make reverse movement difficult.

Of course, the same fixing means may be used for fixing the second cord 200 to the cap 300.

The foregoing description is not limiting on the invention. Accordingly, the opening aid could notably be designed to be fixed on by screwing it on, the ends A, B and C of the first and second cords 100, 200 then including screwholes.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for closing a vehicle optical housing opening, said device including a cap, said cap being configured to close said vehicle optical housing opening in response to a reversible movement of the cap with respect to the vehicle optical housing, wherein said device further includes flexible or articulated connecting means fixed to said cap and designed to be fixed to said vehicle optical housing so that, after opening, said cap remains attached to said vehicle optical housing by said connecting means.

2. The device according to claim 1, wherein said connecting means include a first flexible cord having two ends, a first end including means for fixing it to said cap and a second end including means for fixing it to said vehicle optical housing.

3. The device according to claim 2, wherein said device further includes means for detecting a first opening of said cap.

4. The device according to claim 3, wherein said means for detecting said first opening include a second flexible cord having two ends, a first end including means for fixing it either to said cap or to said vehicle optical housing and a second end connected to said first flexible cord, and in that said second flexible cord includes a portion that changes appearance irreversibly in response to traction, so that the movement of said cap in order to free said opening causes traction on said second flexible cord and therefore its change of appearance.

5. The device according to claim 4, wherein said first end of said second flexible cord includes means for fixing it to said vehicle optical housing and said second end of said second flexible cord is connected at a point of said first flexible cord between said first end and said second end of said first flexible cord.

6. The device according to claim 5, wherein said portion that changes appearance irreversibly is a weak portion of said second flexible cord.

7. The device according to claim 5, wherein said portion that changes appearance irreversibly is a portion adapted to change color.

8. The device according to claim 2, wherein said cap includes fixing means adapted to cooperate with said fixing means of said first flexible cord to effect a simple press-on fixing of one end of said first flexible cord to said cap.

9. The device according to claim 8, wherein said fixing means of said cap adapted to cooperate with said fixing means of said first flexible cord are situated in a vicinity of a periphery of said cap.

10. The device according to claim 2, wherein:
the first end is attached to an external surface of the cap; and
the second end is attached to an external surface of the housing.

11. The device according to claim 4, wherein said first end of said second flexible cord includes means for fixing it to said cap and said second end of said second flexible cord is connected at a point of said first flexible cord between said first end and said second end of said first flexible cord.

12. The device according to claim 4, wherein said first end of said second flexible cord includes means for fixing it to said cap and said second end of said second flexible cord is connected to said first end of said first flexible cord.

13. The device according to claim 4, wherein said first end of said second flexible cord includes means for fixing it to said vehicle optical housing and said second end of said second flexible cord is connected to said second end of said first flexible cord.

14. The device according to claim 4, wherein said portion that changes appearance irreversibly is a weak portion of said second flexible cord.

15. The device according to claim 14, wherein said portion of said second flexible cord that changes appearance irreversibly is one of the following portions: said first end, said second end, a portion between said first end and said second end.

16. The device according to claim 4, wherein said portion that changes appearance irreversibly is a portion adapted to change color.

17. The device according to claim 4, wherein:
the first end of the first cord is attached to an external surface of the cap;
the second end of the first cord is attached to an external surface of the housing; and
the first end of the second cord is attached to the external surface of the cap or the external surface of the housing.

18. A vehicle optical housing including an opening and a device according to claim 1.

19. The vehicle optical housing according to claim 18, comprising:

a first flexible cord having two ends, a first end including means for fixing the first flexible cord to said cap and a second end including means for fixing the first flexible cord to said vehicle optical housing;

a second flexible cord having two ends, a first end including means for fixing the second flexible cord either to said cap or to said vehicle optical housing and a second end connected to said first flexible cord, and wherein said housing includes means adapted to cooperate with one end of said first flexible cord and/or said second flexible cord to effect a press-on fixing of the one end of said first flexible cord and/or said flexible cord to said housing.

20. A Y-shaped flexible cord, comprising:

three branches, and fixing means at first, second and third ends of respective ones of each of the branches, wherein the fixing means at the first end is adapted to be connected to a removable cap of a housing of a lighting module, the fixing means at the second end is adapted to be connected to an external surface of the housing of the lighting module, the fixing means at the third end is adapted to be connected to one of the cap and external surface of the housing of the lighting module, and one of said branches of the Y-shaped flexible cord includes a portion adapted to change appearance irreversibly in response to applied traction from movement of the cap.

21. The cord according to claim 20, wherein said portion that changes appearance irreversibly is a weak portion of said Y shaped flexible cord.

22. The cord according to claim 20, wherein said portion that changes appearance irreversibly is a portion adapted to change color.

23. A linear flexible cord, comprising:

first fixing means at a first end, second fixing means at a second end, and third fixing means at a point between said first end and said second end, said linear flexible cord including a portion of the flexible cord adapted to change appearance irreversibly in response to linear tension produced by applied traction, the first fixing means being adapted to be connected to a removable cap of a housing of lighting module, the second fixing means being adapted to be connected to an external surface of the housing of the lighting module, and the third fixing means being adapted to be connected to one of the cap and housing of the lighting module.

24. The cord according to claim 23, wherein said portion that changes appearance irreversibly is a weak portion of said linear flexible cord.

25. The cord according to claim 23, wherein said portion that changes appearance irreversibly is a portion adapted to change color.

26. A vehicle lighting device, comprising:

a vehicle optical lighting module having a housing;

an opening formed in the vehicle optical lighting module;

a cap configured to fit into the opening, to be attached to the housing at the opening in response to a first movement of the cap with respect to the housing, and be removed from the housing at the opening in response to a second movement of the cap reverse to the first movement; and a flexible or articulated connecting means having one end fixed to the cap and another end fixed to a surface of the housing so that, after opening and removal from the housing, the cap remains attached to the housing by the connecting means.

27. The device according to claim 26, comprising:

said connecting means comprising a first flexible cord; and a second flexible cord having two ends, a first end being fixed to the cap or the housing and a second end connected to the first flexible cord, wherein the second flexible cord includes a portion that changes appearance irreversibly in response to traction, so that the movement of the cap to remove said cap from the housing causes traction on the second flexible cord to change the appearance.

28. The device according to claim 26, wherein:

the one end is attached to an external surface of the cap; and the other end is attached to an external surface of the housing.

* * * * *